United States Patent [19]

Landis

[11] Patent Number: 5,217,231
[45] Date of Patent: Jun. 8, 1993

[54] POWER OF OBSERVATION INVISIBLE INK GAME

[75] Inventor: Thomas J. Landis, County of Floyd, Ind.

[73] Assignee: Stry-Lenkoff Co., Louisville, Ky.

[21] Appl. No.: 891,185

[22] Filed: Jun. 1, 1992

[51] Int. Cl.$^5$ ............................................. A63F 9/00
[52] U.S. Cl. .................................... 273/429; 434/328
[58] Field of Search ............... 273/429, 430, 431, 432, 273/153 R; 434/328, 184

[56] References Cited

U.S. PATENT DOCUMENTS

| | | | |
|---|---|---|---|
| 3,516,177 | 6/1970 | Skinner | 434/328 |
| 3,701,205 | 10/1972 | Wolf | 434/328 |
| 3,826,499 | 7/1974 | Lenkoff | 273/130 |
| 4,045,884 | 9/1977 | Zand | 434/184 |
| 4,084,332 | 4/1978 | Waloszyk et al. | 434/328 |
| 4,514,177 | 4/1985 | Lenkoff | 434/328 |
| 5,160,266 | 11/1992 | Landis | 434/328 |

OTHER PUBLICATIONS

"Hocus-Focus"-The Houston Chronicle publication date unknown.
"Find This Painting"-Stry Denkott Publication, date unknown.
"Find The Twins"-Strylenkoff Publication, date unknown.
"Test your memory"-Stry-Lenkoff, date unknown.

Primary Examiner—William H. Grieb

[57] ABSTRACT

A power of observation game including two sets of visible images with each set including visible images substantially corresponding and with a preselected portion of at least one corresponding image of one set of visible images being visibly incomplete with the completing portion being printed invisibly to be artistically developed visible by an observing participant with a marking member to confirm correctness.

7 Claims, 2 Drawing Sheets

POWER OF OBSERVATION INVISIBLE INK GAME

BACKGROUND OF THE INVENTION

The present invention relates to a novel game assembly and more particularly to a novel game assembly utilizing an invisible ink marking instrument to facilitate the powers of observation relating to a first set of at least one or more images visibly marked on a marking sheet and a second set of at least one or more substantially corresponding visible images including at least one visible image having observable differences from the first set of images marked on a marking sheet in a position removed from the first set of images.

It generally is known to utilize invisible ink in learning devices such as is disclosed in U.S. Pat. No. 3,516,177, issued to B. F. Skinner on Jun. 23, 1970. It also generally is known to utilize invisible ink in game devices such as disclosed in U.S. Pat. No. 3,826, 499, issued to Leon G. Lenkoff on Jul. 30, 1974. Further, it generally is known to provide power of observation learning games which utilize spaced, corresponding visible images on one or more marking sheets with one of the corresponding images being only partially complete, testing the powers of observations to delineate the differences between images, such differences being described and confirmable in visible, inverted printing in an adjacent scoring box. In this regard, attention is directed to the "HOCUS-FOCUS" substantially corresponding image game, published for a number of years in comic sections throughout the United States in various newspapers, such as in the Houston Chronicle. Attention further is directed to similar games such as "FIND THIS PAINTING", "FIND THE TWINS" and "TEST YOUR MEMORY", more recently published in the past few years by Stry-Lenkoff Company of Louisville, Ky. These published Stry-Lenkoff games are comparable to the published and abovedescribed "HOCUS FOCUS" games, only with the answers for observed differences being separately marked in invisible ink for separate answer confirmation by a tested observer with an accompanying marking instrument which serves to make the invisible answers visible.

The present invention recognizes the limitations of these past known published games, combining several of the past features of each in a unique and novel observation game assembly which not only tests an observer to recognize differences in observed substantially corresponding sets of images, but serves to allow the observer to, in fact, complete the image differences as an artistic participant and, to thus obtain an immediate and spontaneous response when correct and to further confirm such artistic completion activities with the marking of an invisibly printed scoring box.

Various other features of the present invention will become obvious to one skilled in the art upon reading the disclosure set forth herein.

BRIEF SUMMARY OF THE INVENTION

More particularly the present invention provides a game involving powers of observation comprising: at least one sheet; a color changing chemical marking means for making portions of the sheet visible; a first set of at least one visible image marked on the sheet; a second set of at least one visible image marked on a sheet remote from the first set of visible image, the first and second sets of visible images each including images substantially corresponding with the exception that a preselected portion of at least one substantially corresponding image of one set of visible images is visibly incomplete with the completing portion being printed invisibly to be developed spontaneously visible by the marking means to artistically complete the image and spontaneously confirm the correctness of the image with its visibly marked corresponding image in the other set of images.

It is to be understood that various changes can be made by one skilled in the art in one or more of the several parts of the inventive game assembly structure set forth herein without departing from the scope or spirit of the present invention. For example, the substantially corresponding images can be alphabetic symbols, Arabic or Roman numerals, or any one of several species of an unlimited number of possible generic groups.

BRIEF DESCRIPTION OF THE DRAWINGS

Referring to the drawings which disclose one advantageous embodiment of the present invention.

DETAILED DESCRIPTION OF THE DRAWINGS

Figure 1:
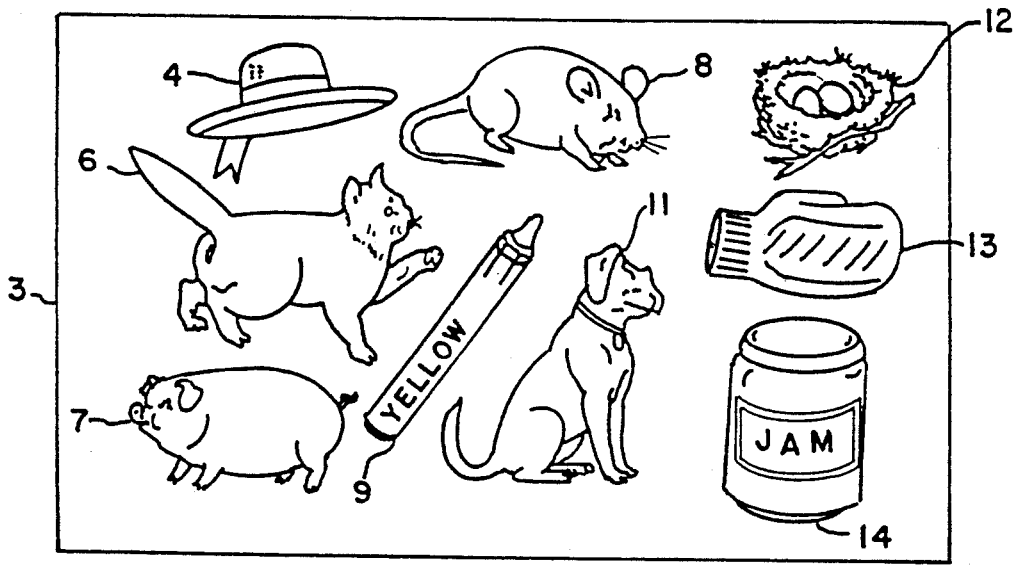
FIG. 1 is a plan view of an observation sheet disclosing one portion of the novel observation game, the sheet having printed thereon a first set of complete spaced visible images accompanied by an instruction paragraph visibly printed thereabove.

Referring to FIG. 1 of the drawings, sheet 2 is disclosed as including a visibly printed border in the form of a lined rectangular box 3 having incorporated therein a first set of spaced images which are visibly printed within box 3.

Nine such spaced images of different types are disclosed including: a ribboned hat 4; a cat 6; a pig 7; a mouse 8; a crayon 9—labeled "Yellow"; a dog 11 with a tag; a bird's nest 12 with two eggs; a mitten 13; and a jar 14—labeled "JAM". It is to be understood that the present invention is not to be considered as limited to the number or type of images disclosed and that any one or more spaced images of different types and character can be utilized. Sheet 2 is accompanied by a visibly printed instruction paragraph 16 which can be located in several possible positions on sheet 2 and is here shown as printed immediately above box 3.

Figure 2:
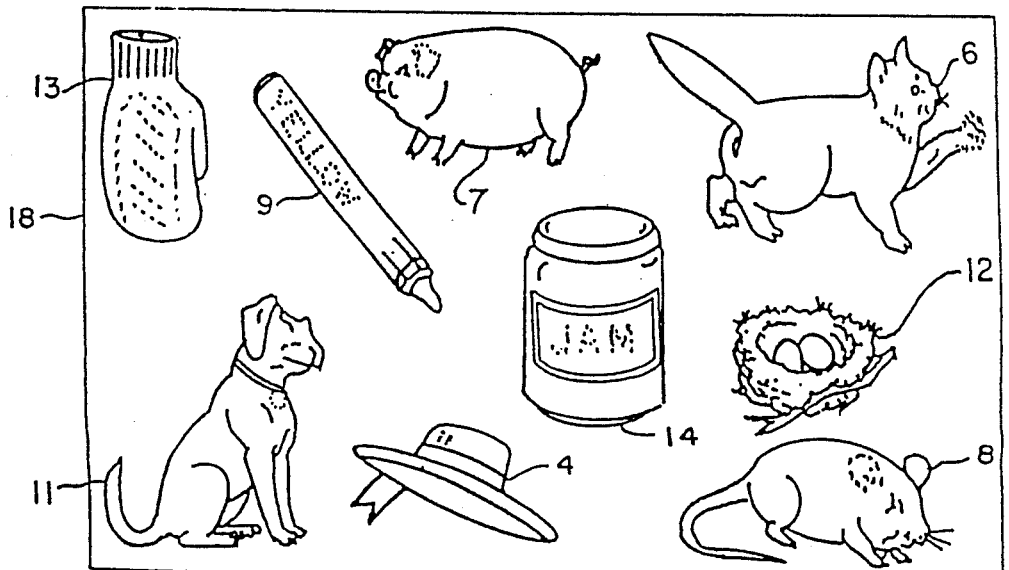
FIG. 2 is a plan view of a marking sheet disclosing another portion of the novel observation game, the marking sheet having visibly printed thereon in different order a second set of spaced visible images substantially corresponding with those spaced images of the first set of images visibly printed on the sheet of FIG. 1 except that a preselected portion of certain selected images are visibly incomplete with the completing portion being printed invisibly as illustrated by the dotted lines, along with accompanying further instructions visibly printed thereabove on the sheet and a confirmation box invisibly printed therebelow—as also is illustrated by the dotted lines; and, FIG. 3 is an isometric view of a color changing marking instrument in the form of a pen and cap which can be used with the marking sheet of FIG. 2.
Figure 3:
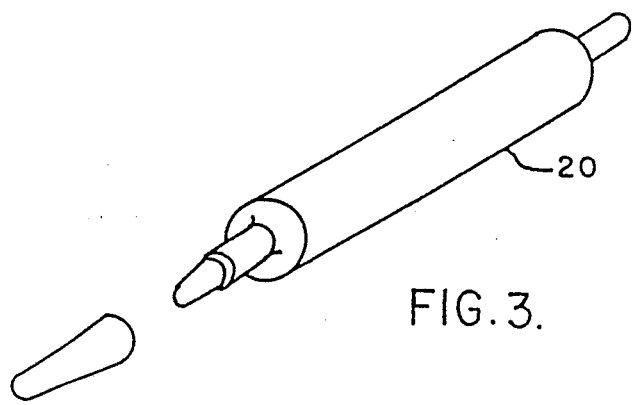

Referring to FIG. 2 of the drawings, sheet 17 which can be printed as a remote page in a booklet or even as a part of sheet 2 is disclosed as including a lined rectangular box 18 having incorporated therein a second set of spaced images visibly printed in part in different order from the first set of images and within a visibly printed border in the form of rectangular box 18 to include nine spaced, printed images substantially corresponding to the nine images within box 3—namely, hat 4, cat 6, pig 7, mouse 8, crayon 9, dog 11, bird's nest 12, mitten 13, and jar 14. A further instructional paragraph 19, which also can be located in several positions on sheet 17, is here shown as printed immediately above box 18. In accordance with the present invention, certain preselected portions of certain preselected images on sheet 17 are not visibly complete but rather are completed with invisible ink printing, as illustrated by dotted lines, to be developed visibly by the color changing chemical marking pen 20 disclosed in FIG. 3 of the drawings. The invisible printing includes the tag on dog 11, the ear on pig 7, the pawprint on cat 6, the color name, "Yellow" on crayon 9, the ear on mouse 8, the printing "JAM", on the label of jar 14, and the line designs on mitten 3. A participating party, upon observing and studying the images on sheet 3, can then artistically visibly develop the incomplete portions above enumerated on sheet 17 with the nib of marking pen 20 to spontaneously confirm by so developing the correctness of the incompleted image with its visibly marked corresponding image of the completely printed images on sheet 2. As a further confirmation and as a scoring means to score the number of areas correctly developed, a visibly printed border in the form of a rectangular box 21 is printed on sheet 17, in this instance, below box 18. As can be seen by the dotted lines in the visibly printed box 21 which represent invisible or latent printing, the correct written answers can be further confirmed with marking pen 20, which serves to make the latent or invisibly printed answers visible to the observer.

It is to be understood that although in the embodiment of the invention disclosed that a certain select number and character of images on sheets 2 and 17 substantially correspond except for the invisibly printed matter, such character and numbers of images in each set can differ—as can the images preselected to be printed partly with invisible ink. It also is to be understood that boxes 3 and 18 can be remotely printed on the same page and, that an additional scoring box can be provided to record the number of images incorrectly selected by an observer.

From the above, it can be seen that a unique game is provided for testing the observation powers of a participating observer, allowing active artistic endeavor upon the part of the participant and providing both spontaneous and written confirmation and scoring.

The invention claimed is:

1. A game involving powers of observation comprising: at least one sheet; a color changing chemical marking means for making portions of said sheet visible; a first set of at least one visible image marked on said sheet; a second set of at least one visible image marked on a sheet remote from said first set of visible images, said first and second sets of visible images each including images substantially corresponding with the exception that a preselected portion of at least one substantially corresponding image of one set of visible images is visibly incomplete with the completing portion being printed invisibly to be developed spontaneously and artistically visible by said marking means to spontaneously confirm the correctness of said image with its visibly marked corresponding image in said other set of images.

2. The power of observation game of claim 1, said images of one set being located on a different marking sheet than are the corresponding images of the other set to insure remoteness.

3. The power of observation game of claim 1, and a scoring means to score the number of areas correctly developed.

4. The power of observation game of claim 1, wherein the number and character of images of one set correspond with the number and character of images of said other set except for said incompletions.

5. The power of observation game of claim 1, wherein the number and character of images of one set exceeds the number and character of images of said other set with preselected images of one of said sets having a visible marking area associated therewith to include a latent invisibly printed image portion to be developed visibly by said marking means to confirm the correctness of said image with its visibly marked corresponding image in said other set of images.

6. The power of observation game of claim 1 and a scoring means to score the number of areas correctly developed, said scoring means including a visible marking area including latent printed images to be developed visibly by said marking means to confirm the correctness of incomplete images marked visibly.

7. A game involving powers of observation comprising:

a first printed sheet having a first set of several spaced images visibly and completely printed thereon within a visibly printed border with visibly printed instructional matter associated therewith; a second printed sheet remotely positioned from said first sheet and having a second set of several spaced images corresponding in number and character with said first set of images but printed in different order from said first set of spaced images, said second set of images being visibly printed within a visibly printed border with further visibly printed instructional matter associated therewith, said second set of visible images each substantially corresponding in character with said first set of images except that a preselected portion of less than the entirety of such images is visibly incomplete with the completing portion being printed invisibly; a color changing chemical marking pen for making said completing portion printed invisibly to be spontaneously and artistically developed visibly to spontaneously confirm the correctness of the image with its visibly marked corresponding image in the first set of images; and, a second visibly printed border on said second sheet associated with said visibly printed border containing said second set of images, said second visibly printed border including latent printed images to be developed visibly by said marking means to further confirm the correctness of incomplete images in said second set of images which have been marked visible.

* * * * *